March 5, 1963  F. L. BERRIDGE ET AL  3,080,066
FLOATING SPRING LOADED RISER DEVICE
Filed Nov. 7, 1960
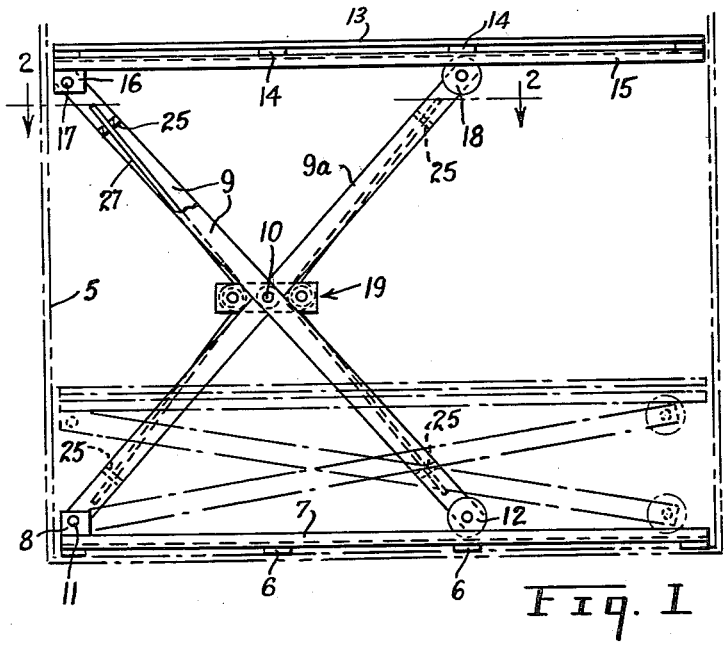
Fig. 1
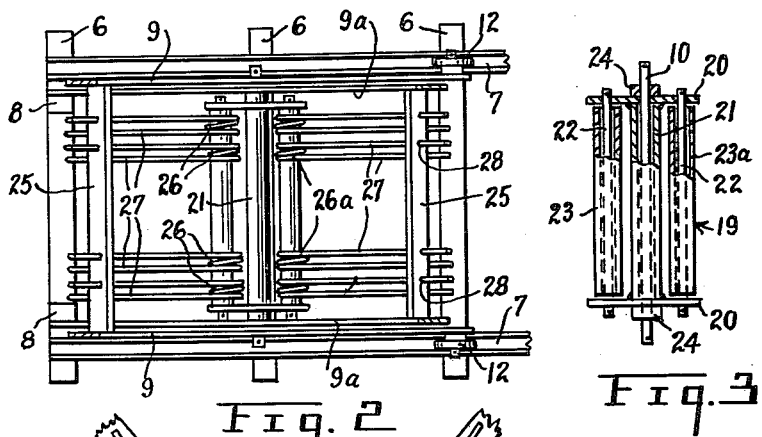
Fig. 2
Fig. 3
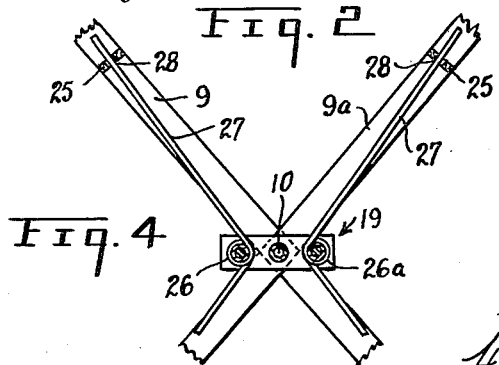
Fig. 4
INVENTORS
F L BERRIDGE
R S BROOKS
BY *Featherstonhaugh & Co.*
ATTORNEYS

United States Patent Office 3,080,066
Patented Mar. 5, 1963

3,080,066
FLOATING SPRING LOADED RISER DEVICE
Frederick L. Berridge and Robert S. Brooks, Montreal,
Quebec, Canada, assignors to Joseph Robb & Company,
Limited, Montreal, Quebec, Canada
Filed Nov. 7, 1960, Ser. No. 67,661
5 Claims. (Cl. 211—49)

This invention relates to floating spring loaded riser devices and particularly to such devices for use in hand trucks and boxes for the purpose of providing a floating platform therein, whereby the floating platform will rise or be lowered smoothly on change of the load carried by the platform.

Spring loaded devices of this nature are known but invariably these devices have been unsatisfactory in that the movement of the false bottom carrying the load has been erratic due to excessive friction developed by the springs on the pivot shaft connecting the frames supporting the false bottom and particularly between the coils of individual springs when such springs are loosely mounted about the pivot shaft.

The present invention consists essentially in providing a spring carrying cradle pivotally mounted on the pivot shaft connecting the frames supporting the load carrying platform, the said cradle having a pair of freely rotating spring carrying sleeves spaced apart on either side of the pivot shaft. The coil springs mounted on each of the sleeves have their extended ends directed outwards of the pivot shaft and are threaded through spaced apart apertures in transverse brace members at or near the ends of the frames. The cradle supporting the coil springs is held by the springs in a relatively-horizontal plane in any vertical position of the load carrying platform without any direct frictional contact of the springs with the pivot shaft.

The object of the invention is to eliminate to a large extent excessive friction at the pivot shaft connecting the frames of a spring loaded riser device.

A further object of the invention is to provide a free floating spring supporting cradle, supporting the springs in a horizontal plane on either side of the pivot shaft in a spring loaded riser device.

A further object of the invention is to provide brace members forming the ends of pairs of frames with the brace members having spaced apart apertures to receive the free extended ends of the coil springs.

These and other objects of the invention will be apparent from the following detailed description and the accompanying drawings, in which:

FIG. 1 is a side elevational view of the floating spring loaded riser device showing in solid lines the device in the raised position and in chain dot lines the devices in a lowered position.

FIG. 2 is a sectional plan view taken on the line 2—2 of FIG. 1.

FIG. 3 is a plan view partly in section of the spring carrying cradle mounted on the pivot shaft of the device.

FIG. 4 is a partial vertical sectional view of the cradle and frames and showing the springs in their operative position on the cradle and brace members of the frames.

Referring to the drawings, the hand truck or box within which the device hereinafter described is shown by double chain dot lines 5 in FIG. 1. It is to be understood that, while the device may be mainly used within hand trucks or boxes, it can be used by itself as a floating support for other purposes.

The device is here shown as being supported on a series of cross-bars 6 carrying a pair of spaced apart channel rails 7 and the support brackets 8 located at one end of the rails. Two pairs of frames 9 and 9a are pivotally mounted, midway of their length, on the pivot shaft 10.

The lower ends of the frames 9a are pivotally mounted on the brackets 8 by the pivot pins 11, while the lower ends of the frames 9 each has a roller 12 mounted thereon and adapted to run in the channel rails 7.

A load carrying platform 13 is supported by the crossbars 14 on the top surface of the inverted channel rails 15. A pair of brackets 16, project downwardly from the cross-bar 14 immediately above the brackets 8. The top ends of the frames 9 are pivotally mounted on the brackets 16 by the pivot pins 17, while the top ends of the frames 9a have rollers 18 mounted thereon and adapted to run in the channel rails 15.

A cradle 19 comprising a pair of end plates 20 drilled midway of the length for mounting on the pivot shaft 10, are held in spaced apart relation by the spacer tube 21. A pair of shafts 22 are mounted between the end plates 20 and support, for free rotation thereon, the sleeves 23 and 23a. Spacers 24 fitted about the pivot shaft 10 on the outside of the end plates 20, space the cradle 19 from the inner surfaces of the frame 9a so that the cradle is free to rotate therebetween.

The frames 9 and 9a are joined together by the brace members 25 located near the outer ends of the frames so that the frame 9 forms a fixed pivotal unit as does the frame 9a A series of coil springs 26 are mounted about the sleeve 23 on the cradle 19 and a similar series of springs 26a are mounted about the sleeve 23a. Each of the coil springs 26 and 26a have extended ends 27 projected outwardly in a direction away from the pivot shaft and threaded through apertures 28 in the brace members 25. The spacing of the apertures 28 in the brace members 25 is such that they tend to hold the coil springs 26 and 26a apart from each other on their respective sleeves 23 and 23a.

In the operation of this device, the springs 26 and 26a tend to stabilize the cradle in the horizontal plane passing through the axis of the pivot shaft 10 in all vertical positions of the device, and should the platform 13 be loaded heavier at one end than the other, the series of springs located on their side of the pivotal shaft 10 will offer greater resistance than the other series of springs, thereby tending to keep the platform level.

As the platform 13 is lowered by a load placed thereon and against the resistance of the springs 26 and 26a, the ends of the frames 9 and 9a supporting the rollers 12, will move outwards along the rails 7 and 15 with the pressure of the springs 26a keeping the rollers 12 in contact with the rails 7 and 15. As the load on the platform increases, the device will ultimately take up the position shown in chain dot lines in FIG. 1.

During movement up or down of the device the cradle 19 will freely take up a position of balance on the pivot shaft 10 and generally in a horizontal plane. By mounting the individual coil spring on the sleeves 23 and 23a, any binding on the shafts 22 caused by pressure from the extended legs of the springs will be largely eliminated. Furthermore, by having the extended legs of the springs threaded through spaced apart apertures, the individual springs will be held apart on the sleeves 23 and 23a and so prevent binding between them. Stressing of either group of springs 26 and 26a by uneven loading of the platform 13 will be counteracted by the springs of the other group and a possible slight rotation of the cradle 19 about the pivot shaft 10 without appreciable added friction between the cradle and the shaft 10 and will not affect the relative displacement of the frames 9 and 9a to each other.

What we claim is:

1. In a floating spring loaded riser device including a pair of frames, one located within the other, a pivot shaft passing through the said frames midway of their length to permit the pivoting of the said frames relative to each other and a platform pivotally mounted in a horizontal plane on horizontally opposing ends of the said frames, a cradle pivotally mounted on the said pivot shaft and within the said frames, the said cradle having a pair of shafts parallel with and in spaced apart relationship on either side of said pivot shaft, and one or more springs mounted on each of said pair of shafts, the said springs having extended ends in spring pressure contact with the vertically opposed ends of said frames, the said springs holding the vertically opposed ends of the said frames apart in floating relationship.

2. A floating spring loaded riser device as set forth in claim 1, in which the said cradle includes a pair of sleeves rotatably mounted on the said pair of shafts and about which the said springs are mounted.

3. A floating spring loaded riser device as set forth in claim 1, in which the said cradle includes a pair of side plates, a spacer sleeve secured between said side plates, the said spacer sleeve being journalled on said pivot shaft.

4. A floating spring loaded riser device as set forth in claim 1, in which the said frames are provided with end brace members having a series of apertures therethrough and through which the extended ends of the springs are threaded.

5. A floating spring loaded riser device as set forth in claim 4 in which the ends of the springs threaded through the apertures in the brace members hold the said springs in spaced relation to each other on the pair of shafts of said cradle.

References Cited in the file of this patent
UNITED STATES PATENTS

| | | |
|---|---|---|
| 2,798,640 | Coddington | July 9, 1957 |
| 2,798,641 | Coddington | July 9, 1957 |